United States Patent
Saade Saade et al.

(10) Patent No.: US 11,892,123 B2
(45) Date of Patent: Feb. 6, 2024

(54) STRATEGIES FOR SAFE FAST-FILL OF COMPRESSED GAS TANKS

(71) Applicant: Linamar Corporation, Guelph (CA)

(72) Inventors: Maria Elizabeth Saade Saade, N/A (IT); Jason Wexler, San Francisco, CA (US)

(73) Assignee: Linamar Corporation, Guelph (CA)

( * ) Notice: Subject to any disclaimer, the term of this patent is extended or adjusted under 35 U.S.C. 154(b) by 100 days.

(21) Appl. No.: 17/623,442

(22) PCT Filed: Jun. 29, 2020

(86) PCT No.: PCT/US2020/070212
§ 371 (c)(1),
(2) Date: Dec. 28, 2021

(87) PCT Pub. No.: WO2020/264584
PCT Pub. Date: Dec. 30, 2020

(65) Prior Publication Data
US 2022/0349522 A1  Nov. 3, 2022

Related U.S. Application Data

(60) Provisional application No. 62/867,913, filed on Jun. 28, 2019.

(51) Int. Cl.
*F17C 1/06* (2006.01)
(52) U.S. Cl.
CPC ........ *F17C 1/06* (2013.01); *F17C 2201/0138* (2013.01); *F17C 2203/0604* (2013.01);
(Continued)
(58) Field of Classification Search
CPC ............... F17C 1/06; F17C 2205/0326; F17C 2205/0332; F17C 2205/0335;
(Continued)

(56) References Cited

U.S. PATENT DOCUMENTS

| 6,527,075 B1* | 3/2003 | Izuchukwu | A61G 3/001 180/69.5 |
| 7,137,409 B2* | 11/2006 | Pouchkarev | F17C 1/00 383/107 |
| 11,738,636 B2* | 8/2023 | Veenstra | G05D 7/0629 137/340 |
| 2008/0216914 A1* | 9/2008 | Handa | F17C 13/12 141/4 |

(Continued)

FOREIGN PATENT DOCUMENTS

| DE | 102013015519 | 3/2015 |
| DE | 102018000756 | 1/2019 |

(Continued)

OTHER PUBLICATIONS

DE-102017220715-A1 English Translation of Specification (Year: 2022).*

(Continued)

*Primary Examiner* — David Colon-Morales
*Assistant Examiner* — Stephanie A Shrieves
(74) *Attorney, Agent, or Firm* — Miller Canfield (57) ABSTRACT

A type IV conformable pressure vessel is provided comprising an elongated folded tank and a valve assembly configured to pass fluid into and out of an interior of the tank through first and second filling couplers directly connected to a respective first and second end of the tank. The tank has at least two chambers for the storage of fluid. The valve assembly receives fluid from an external source, selectively provides the external fluid through a Venturi nozzle into a mixing chamber, recirculates fluid from the second end of the tank into the mixing chamber, and delivers the mixture of the recirculated fluid and the external fluid to the first end of the tank.

15 Claims, 6 Drawing Sheets

(52) U.S. Cl.
CPC .......... *F17C 2203/066* (2013.01); *F17C 2203/0619* (2013.01); *F17C 2203/0663* (2013.01); *F17C 2205/0305* (2013.01); *F17C 2205/0326* (2013.01); *F17C 2205/0332* (2013.01); *F17C 2205/0335* (2013.01); *F17C 2205/0341* (2013.01); *F17C 2205/0397* (2013.01); *F17C 2221/012* (2013.01); *F17C 2221/014* (2013.01); *F17C 2221/017* (2013.01); *F17C 2221/033* (2013.01); *F17C 2221/035* (2013.01); *F17C 2223/0123* (2013.01); *F17C 2223/036* (2013.01); *F17C 2227/0114* (2013.01); *F17C 2227/0344* (2013.01); *F17C 2250/0439* (2013.01); *F17C 2265/066* (2013.01); *F17C 2270/0168* (2013.01)

(58) Field of Classification Search
CPC ........ F17C 2205/0397; F17C 2221/012; F17C 2270/0168; F17C 2260/023; F17C 2227/0114; Y02E 60/32; B60K 2015/03118; B60K 2015/03164
USPC .............................. 141/4, 103; 220/581, 586
See application file for complete search history.

(56) References Cited

U.S. PATENT DOCUMENTS

| | | | | |
|---|---|---|---|---|
| 2014/0305951 | A1* | 10/2014 | Griffith | F17C 1/00 220/581 |
| 2015/0048095 | A1* | 2/2015 | Sanders | B65B 5/04 220/586 |
| 2018/0080609 | A1* | 3/2018 | Abd Elhamid | F17C 13/02 |
| 2018/0283612 | A1* | 10/2018 | Wexler | F17C 13/026 |
| 2019/0120432 | A1 | 4/2019 | Wexler | |

FOREIGN PATENT DOCUMENTS

| | | |
|---|---|---|
| DE | 102017220715 | 5/2019 |
| DE | 102017220715 A1 * | 5/2019 |

OTHER PUBLICATIONS

International Search Report for PCT/US2020/070212.
Written Opinion of the International Searching Authority for PCT/US2020/070212.

\* cited by examiner

STRATEGIES FOR SAFE FAST-FILL OF COMPRESSED GAS TANKS

CROSS-REFERENCE TO RELATED APPLICATIONS

This application claims priority to U.S. Provisional Application No. 62/867,913, filed on Jun. 28, 2019.

BACKGROUND OF THE INVENTION

1. Field of the Invention

The present invention relates to filling Type IV pressure vessels with hydrogen gas. More particularly, the invention relates to a compressed gas pressure vessel with at least two chambers fluidically connected through a valve assembly having a Venturi nozzle to induce recirculation of hydrogen between the at least two chambers to maintain hydrogen gas temperature below a safety threshold, such as 85° C., during filling of the pressure vessel with hydrogen gas.

2. Description of Related Art

Pressure vessels commonly store fluids and/or gases under pressure, such as natural gas, oxygen, nitrogen, hydrogen, propane, and the like. Type IV pressure vessels or tanks have a metal-free construction typically comprising a carbon fiber or composite wound and/or braided over a thermoplastic polymeric liner. Certain Type IV pressure vessels comprise an elongated vessel having a plurality of chambers for storage of gas, also described as conformable pressure vessels. The elongated pressure vessels can be configured for use as pressurized gaseous fuel tanks for use in vehicles.

Typically, a first valve is coupled to a first end of the pressure vessel for filling the pressure vessel with compressed gas. Further, elongated pressure vessels may have a second valve coupled to a second end of the pressure vessel. The first and second valves are configured to transfer gas into an internal space of the pressure vessel defined by a liner outer wall.

The elongated pressure vessel can experience heating when filling due to heat of compression and, for some gases, to the Joule-Thomson effect. The gas within the pressure vessel is compressed as additional gas is added to the pressure vessel, resulting in heat generation. For safety, some compressed fuel filling stations control the filling rate to avoid dangerously high temperatures. In addition, the high temperatures can be undesirable because they can result in low density at a given pressure, thus requiring overpressure to reach the target density (state of charge near 100%) or under-filled pressure vessels.

Such heat generation can therefore result in undesirably long filling times that take longer than filling gasoline or diesel fuel tanks and/or result in under-filled pressure vessels. To mitigate these issues associated with pressure vessels, many stations have an option of gas pre-cooling. With gas pre-cooling, the gas is cooled to a low temperature (e.g., as low −40° C.) before the gas enters the pressure vessel. This has the effect of lowering the maximum temperature that the gas reaches due to heat of compression, since the initial temperature is lower.

Gas pre-cooling can add significant additional complexity to the construction of fueling stations, which can undesirably increase capital cost and operational cost for the fueling station. This increased cost may be transferred to the customer in the form of higher gas prices. In addition, pre-cooling components can have poor reliability in some examples, resulting in significant station downtime and additional cost due to maintenance and replacement parts.

Elongated conformable pressure vessels, such as discussed herein, can be advantageous over conventional monolithic compressed gas tanks because the conformable shapes can have more surface area per unit volume of storage. Such increased surface area can allow for more rapid heat dissipation, which can increase fast-fill performance. In addition, such conformable tanks can have a smaller cross-sectional area, which can result in higher flow velocity during filling and hence better convective heat transfer from the gas to the pressure vessel wall (i.e., higher Nusselt number).

During filling or fast-fill, such conformable pressure vessels can reach a lower average temperature than conventional monolithic pressure vessels. This can be because such conformable pressure vessels have a higher ratio of surface area to volume, and because the gas can have a higher average speed due to the smaller tank diameter, resulting in greater convective heat transfer. This can result in a reduced need for gas pre-cooling. Conformable pressure vessels can thus be filled with fluid that is precooled to a higher temperature or not precooled at all, while still achieving the filling speeds that are normally associated with pre-cooled gas.

However, insufficient mixing can occur during the filling of various conformable pressure vessels due to their elongated shape, meaning that the difference between maximum and minimum temperature at the end of a filling process can be much more extreme than for other configurations of pressure vessels. In particular, when gas is added to the pressure vessel through the first valve attached at the first end of the pressure vessel, the gas temperature near the first end of the pressure vessel can remain close to the temperature of the inflowing gas, since the flow speed at the first end can result in good heat transfer to the liner and outer composite shell. Chambers of the pressure vessel that are near the second end of the pressure vessel, on the other hand, can heat up considerably because there is little flow in the far region of the pressure vessel. Further, these chambers near the second end of the pressure vessel have poor convective heat transfer.

A first known method of mitigating such a temperature rise near the second end of the pressure vessel is by filling from alternating ends of the pressure vessel, such as disclosed in U.S. publication No. 2019/120432. For example, at the start of fill, the pressure vessel can be filled through the first valve attached to the first end of the pressure vessel, allowing the temperature of the fluid near the second end of the pressure vessel to rise. When the temperature of the fluid near the second end reaches a defined high value, the first valve at the first end of the pressure vessel is closed and the pressure vessel is filled through the second valve at the second end. This pattern can be repeated until the pressure vessel is filled.

However, the first known method can result in elevated fluid temperatures in chambers midway between the two ends of the pressure vessel. Additional pre-cooling of the gas may be required and/or pre-cooling to a lower temperature to assure that the fluid in chambers furthest from the first and second valves have temperatures within a predetermined temperature range. Further, additional hardware and controls are required to support switching between the valves at each end of the pressure vessel during fill.

A second known method of mitigating such a temperature rise within the elongated pressure vessel is accomplished by including a Venturi-based mixing system within the filling station equipment. As described in U.S. publication No. 2019/120432, fluid within the pressure vessel is removed through the second valve attached to the second end of the pressure vessel and fed into a Venturi mixing chamber through an external high pressure line. Fluid from an external fluid source is fed into the Venturi mixing chamber through a Venturi nozzle. Fluid passing through the Venturi nozzle causes hot fluid to be pulled through the suction line and mixed with the fluid passing through the Venturi nozzle. The Venturi mixing chamber includes an outlet pressure line configured to provide the mixed fluid through the valve attached to the first end of the pressure vessel. The fluid provided to the Venturi nozzle can be pre-cooled if required to lower the temperature of fluid within the pressure vessel. The recirculation of the fluid from the pressure vessel, through the suction line, the Venturi mixing chamber, and returning to the pressure vessel causes fluid movement within the pressure vessel.

While the second method can mitigate a certain amount of temperature rise within the elongated pressure vessel, for pressure vessels having a plurality of chambers elevated fluid temperatures over a targeted temperature may still occur due to insufficient flow within the pressure vessel. As such, various chambers within the pressure vessel may see localized elevated temperatures. The localized elevated temperatures can be mitigated by pre-cooling the added fluid to a lower temperature. Alternatively, the Venturi nozzle can be optimized to improve mixing of the hot fluid and the pre-cooled fluid. However, it is preferable to minimize the amount of pre-cooling required for the external fluid source as well as minimizing the temperature rise of the fluid in the pressure vessel.

Further, when a Venturi mixing chamber is included within an inlet fill line of the filling station, a secondary suction line must be coupled to one end of the pressure vessel and routed to the Venturi mixing chamber. When the ends of the pressure vessel are spaced far apart, the secondary suction line must be routed to the Venturi mixing chamber. This can result in a length of suction line that is less protected that the liner of the pressure vessel covered in the outer composite shell. In addition, the extended length of the suction line can develop leaks. Further, the suction line has a pressure drop related to the overall length of the suction line. Thus, as the length of the suction line is increased, the pressure in the suction line is decreased and the overall efficiency of the Venturi-based mixing system is reduced.

Thus, a method is desired wherein the suction line connecting one end of the pressure vessel to the Venturi mixing chamber is as short as possible. Further, an alternative is desired wherein the suction line is protected within a housing assembly.

It is desirable, therefore, to provide a valve assembly that fluidically couples opposing ends of an elongated pressure vessel for filling and removing fluid from an interior of the pressure vessel. Further, it is desirable to provide a Venturi nozzle and a Venturi mixing chamber within the valve assembly that is fluidically coupled to both ends of the elongated pressure vessel. In addition, it is desirable to minimize the length of connecting fluid lines between the Venturi mixing chamber and both ends of the pressure vessel. It is also desirable to provide a stacking architecture of the elongated pressure vessel such that the valve assembly can couple directly to both ends of the pressure vessel without using external fluid lines Finally, it is desirable to improve heat dissipation from the pressure vessel during the fill process.

SUMMARY OF THE INVENTION

A pressure vessel is provided comprising an elongated folded tank and a valve assembly configured to pass fluid into and out of an interior of the tank through first and second filling couplers directly connected to a respective first and second end of the tank. The tank has at least two chambers for the storage of fluid. The valve assembly receives fluid from an external source, selectively provides the external fluid through a Venturi nozzle into a mixing chamber, recirculates fluid from the second end of the tank into the mixing chamber, and delivers the mixture of the recirculated fluid and the external fluid to the first end of the tank.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
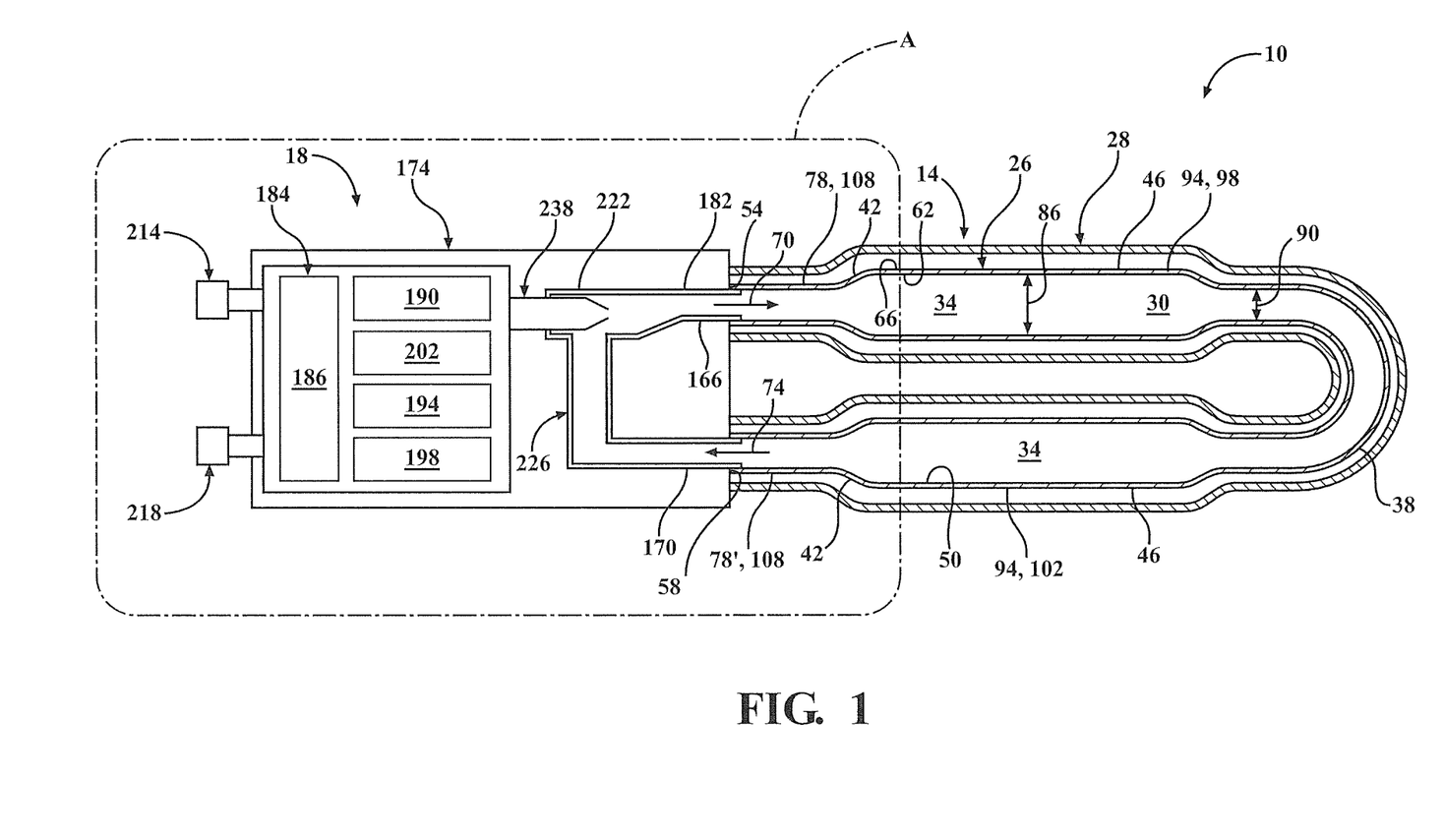
FIG. 1 is a cross-sectional view of a conformable pressure vessel having an inlet and an outlet of a tank directly coupled to a valve assembly, according to one embodiment of the present invention.
Figure 2:
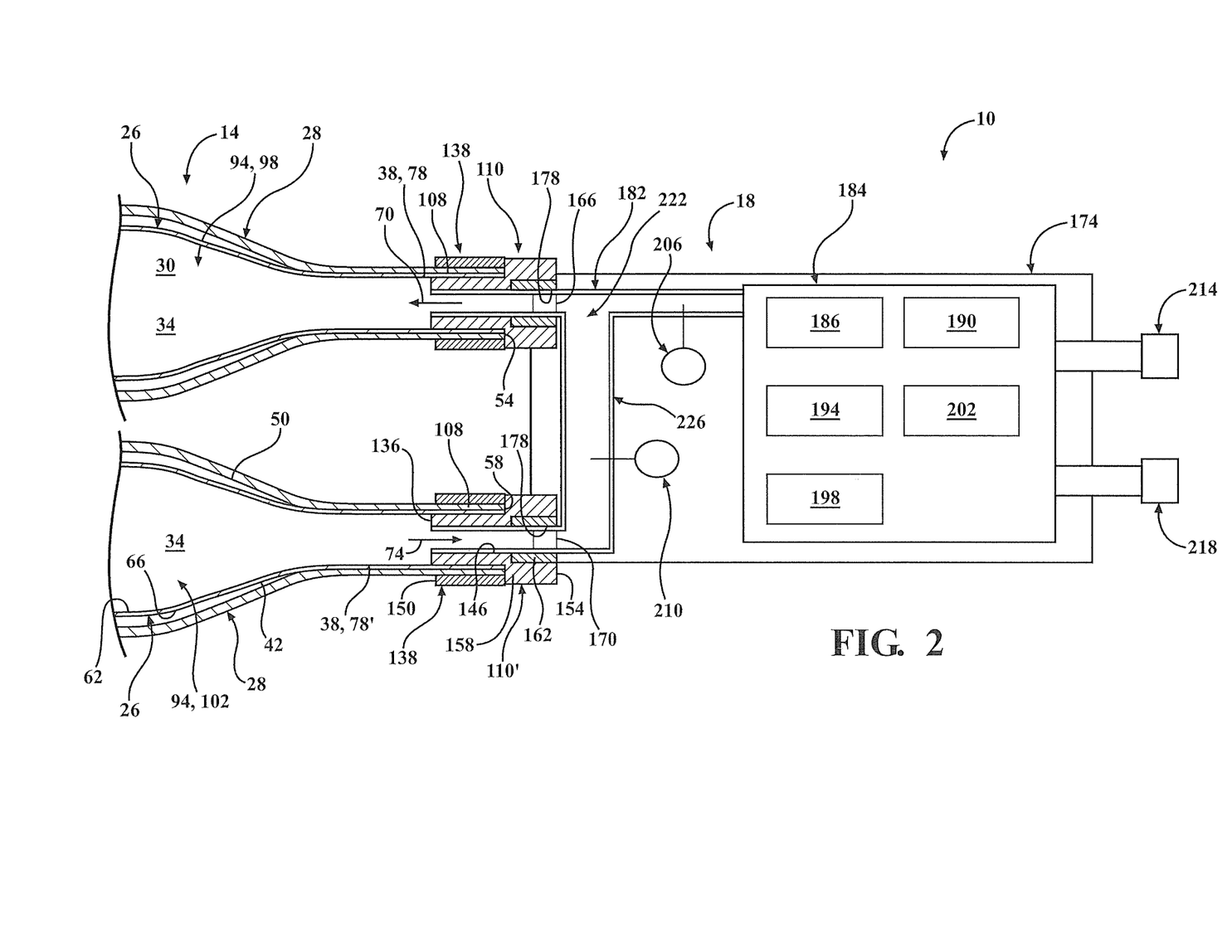
FIG. 2 is an enlarged cross-sectional view of a first embodiment of portion A of the pressure vessel of FIG. 1, illustrating functional components of the valve assembly and connections between the valve assembly and the tank.

Referring to the Figures, wherein like numerals indicate like or corresponding parts throughout the several views, a type IV pressure vessel 10 for containing liquids and/or gases under pressure is shown in FIGS. 1 and 2, according to one embodiment of the present invention. The pressure vessel 10 is suitable for storage of compressed liquids and/or gases, such as hydrogen, nitrogen, natural gas, helium, dimethyl ether, liquefied petroleum gas, xenon, and the like. A pressure vessel 10 for storage of hydrogen for automotive applications typically is designed for about 5,000 PSI to about 10,000 PSI of internal pressure during normal use. In comparison, pressure vessels 10 for storage of compressed natural gas are typically designed for about 3,000 PSI of internal pressure during normal use.

Referring to FIGS. 1 and 2, the pressure vessel 10 comprises an elongated conformable tank 14 fixedly coupled to an valve assembly 18 referring to herein as an On-Tank-Valve (OTV) assembly 18. The elongated conformable tank 14 has a polymeric liner 26 having an interior 30 for storage of fluid and/or gas 34. As will be further described below, the polymeric liner 26 is surrounded by an outer composite shell 28 to form the conformable tank 14. The terms "fluid" and "gas" are used interchangeably herein since gases such as hydrogen gas will be in a gaseous form or a fluid form (e.g., "liquid" form) depending on the pressure and temperature at which the hydrogen gas is stored.

Figure 3:
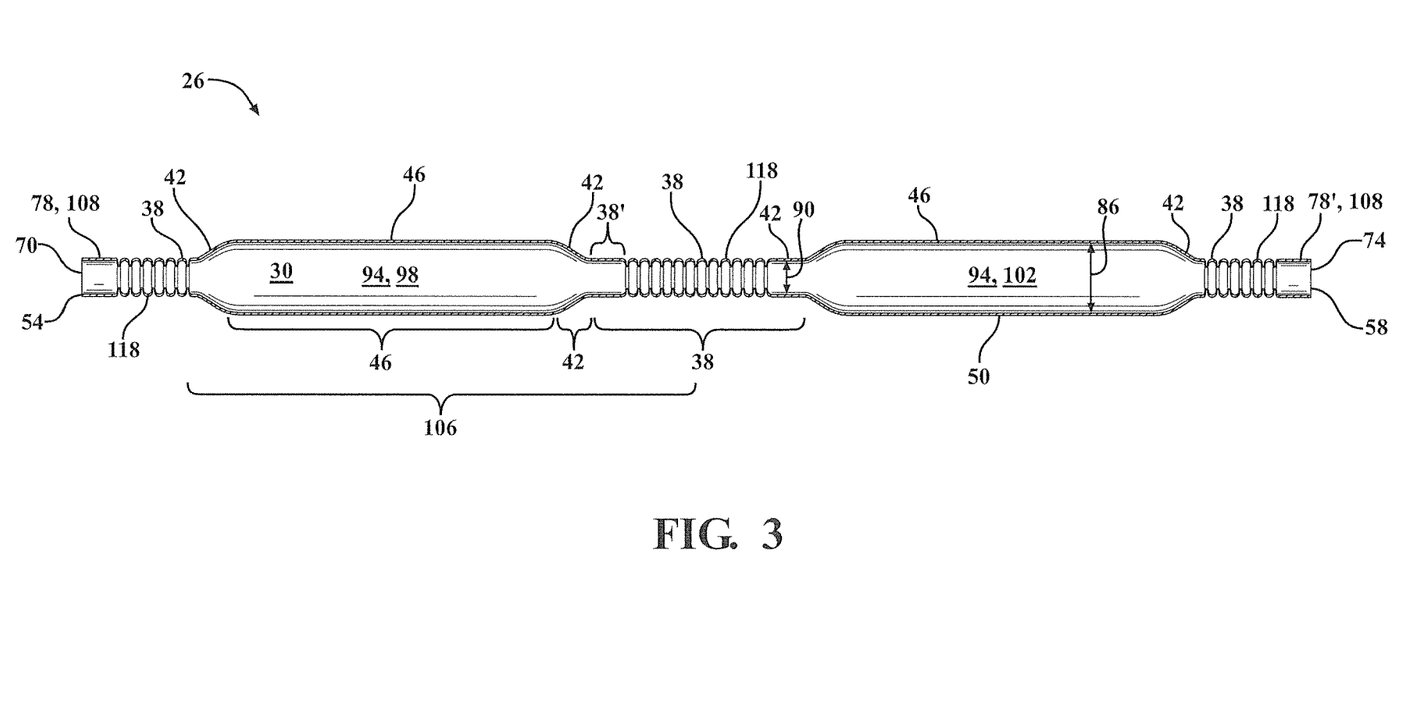
FIG. 3 shows a perspective view of a polymeric liner removed from the pressure vessel of FIG. 1.

FIG. 3 illustrates one embodiment of a bare liner 26 comprising a hollow body 30 having connector portions 38, taper portions 42, and tubing portions 46. The hollow body 30 is defined by an elongated cylindrical wall 50 extending between a first terminal end 54 and a second terminal end 58 of the liner 26. Turning to FIGS. 1 and 2, the polymeric liner 26 includes opposing inner and outer surfaces 62, 66, an inlet opening 70 at the first terminal end 54 of the liner 26, and an outlet opening 74 at the second terminal end 58 of the liner 26. Each of the inlet opening 70 and the outlet opening 74 to the liner 26 can be used to pass fluid and/or gas 34 into and/or out of the interior 30 of the liner 26 as desired. Each of the inlet and outlet openings 70, 74 of the liner 26 are defined by a neck outlet 78, 78' of the liner 26.

Referring to FIG. 3, the liner 26 includes a plurality of elongated rigid tubing portions 46 having a first diameter 86, a plurality of connector portions 38 having a second diameter 90 that is smaller than the first diameter 86, and taper portions 42 disposed between and coupling successive elongated rigid tubing portions 46 and connector portions 38. The first diameter 86 and the second diameter 90 are defined as the outer diameter 86, 90 of the tubing portions 46 and the connector portions 38, respectively. Each of the plurality of elongated rigid tubing portions 46 defines a respective chamber 94 for storage of a fluid 34 with a first chamber 98 defined adjacent the first end 54 of the liner 26 and a last chamber 102 defined adjacent the second end 58 of the liner 26. Other embodiments of the liner 26 can include any number of chambers 94 between the first chamber 98 and the last chamber 102 as desired for specific applications. Alternatively, the liner 26 can include a single elongated chamber 94 extending between the ends 54, 58 of the liner 26.

A repeating liner section 106 is illustrated in FIG. 3. The repeating liner section 106 is defined as comprising a single rigid tubing portion 46 in combination with taper portions 42 and connector portions 38 attached to the rigid tubing portion 46. Various embodiments of the liner 26 can include any desired number of repeating liner sections 106 forming any desired number of chambers 94 for storage of fluid 34. Individual liner sections 106 can vary in dimensions, shapes, and the like. Certain liner sections 106 can include tubing portions 46, connector portions 38, and tapered portions 42 having different outer diameters, lengths, and shapes, as non-limiting examples. In some embodiments, certain liner sections 106 may have a length shorter or longer than the length of other liner sections 106. In other embodiments, the length of individual connector portions 38 can be selected such that the liner 26 is foldable into a desired stacking architecture 126 (shown in FIG. 4). Thus, the repeating liner sections 106 can be identical or the repeating liner sections 106 can include one or more configurations. For example, the liner 106 sections at the terminal ends 54, 58 can include connector portions 38 having cuff portions 108 configured to matingly and/or frictionally engage with boss-style fittings 110, 110' as shown in FIG. 2 and further described below.

Figure 4:
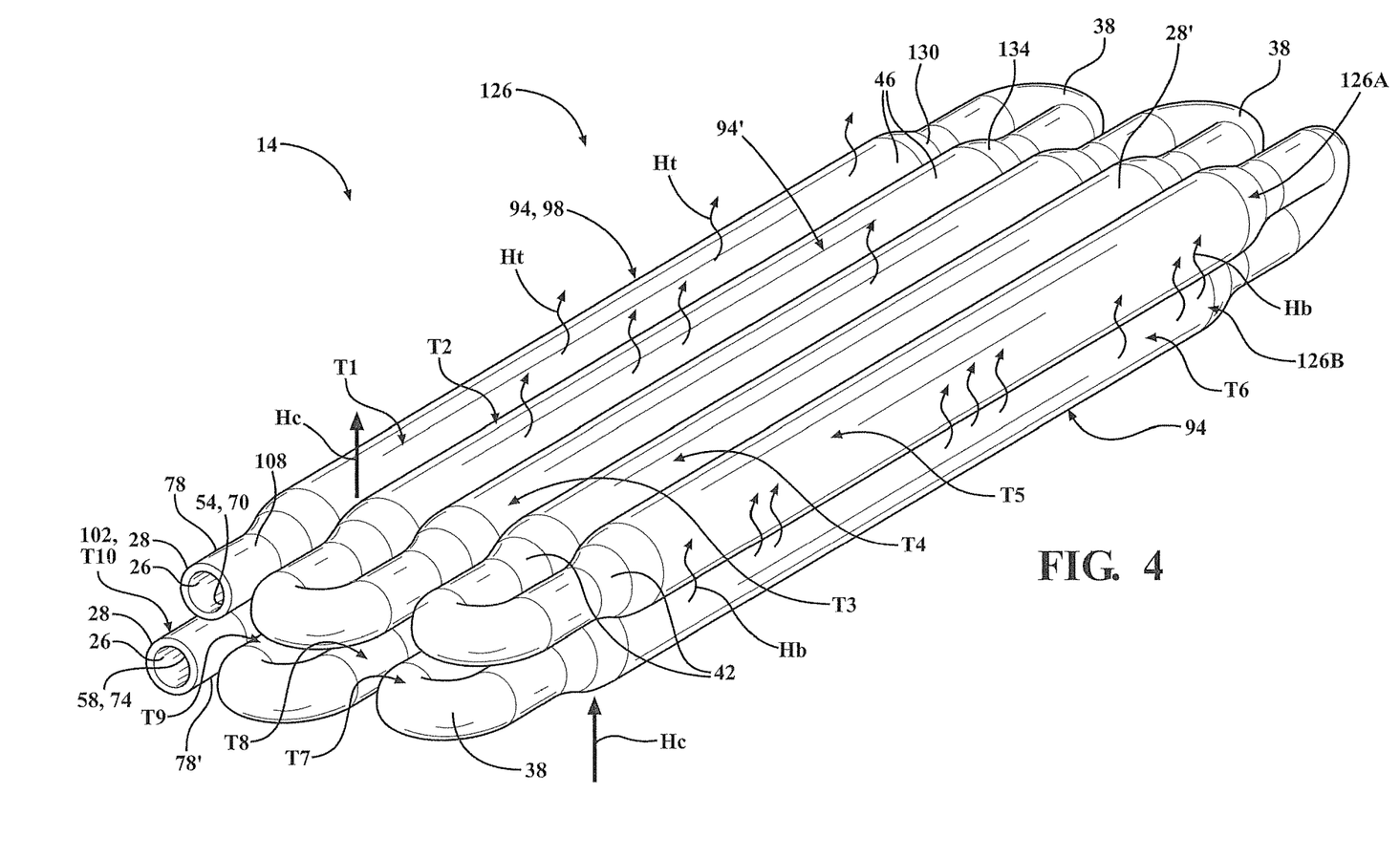
FIG. 4 shows a perspective view of a tank for a conformable pressure vessel wherein the tank is folded into a stacking architecture, according to one embodiment of the present invention.

The connector portions 38, shown in FIGS. 3 and 4, can be corrugated 118, which allow the connector portions 38 to be flexible such that the liner 26 can be folded into a stacking architecture 126 to fill a predetermined space and/or folded into a housing. Non-corrugated connector portions 38' can be rigid in various embodiments. In various embodiments, the connector portions 38 can have a diameter 90 that is smaller than the diameter 86 of the tubing portions 46, with the taper portions 42 providing a transition between the diameter 90, 86 of the connector portions 38 and the tubing portion 46. However, further embodiments can comprise a liner 26 with portions 38, 42, 46 having one or more suitable diameters 86, 90, and in further embodiments, a liner 26 can have portions 38, 42, 48 that are non-cylindrical, which can include various shapes. Similarly, in some embodiments, the tubing portions 46 can comprise corrugations 118.

Preferably, the liner 26 is manufactured as a seamless liner with no welds and using a single material, as illustrated in FIG. 3. However, in some embodiments individual liner segments 106 comprising a single chamber 94 can be connected together to form an elongated liner 26 comprising a plurality of chambers 94. In some embodiments, a liner 26 can be made by forming various pieces 38, 42, 48 of the liner 26 and then coupling the pieces 38, 42, 48 together. For example, connector portions 38 can be manufactured separately from the taper portions 42, the tubing portion 46, and/or the cuff portions 108. Such separate portions 38, 42, 48, 108 can be subsequently coupled together to form the liner 106.

The polymeric liner 26, shown in FIG. 3, is generally formed from one or more polymeric materials such as Nylon (PA), ethylene-vinyl acetate (EVA), linear low-density polyethylene (LLDPE), low-density polyethylene (LDPE), high-density polyethylene (HDPE), polypropylene (PP), ethylene vinyl alcohol (EVOH), polytetrafluoroethylene (PTFE), polyurethane (PU), polyvinyl chloride (PVC), and/or similar materials. The polymeric liner 26 can be formed of a single layer of polymeric material. Alternatively, the polymeric liner 26 can be formed of a multi-layered structure of two or more polymeric layers. Further, one or more metal layers can be included within the liner 26, as desired for specific applications.

The liner 26 can be wrapped and/or over-braided with fiber strands impregnated with resin, or with other suitable materials, to increase the strength of the liner 26 and thereby increase the duty pressure under which the liner 26 may safely operate. Additionally, braiding can be disposed in a plurality of layers in various embodiments. The one or more layers of fiber strands impregnated with resin form a hard outer composite shell 28 after the resin is cured.

The outer composite shell 28, shown in FIG. 1, includes one or more layers of resin impregnated fiber strands. Suitable fibers for the outer composite shell 28 include one or more of carbon fiber, glass fiber, basalt fiber, boron fiber, aramid fiber, high-density polyethylene fiber (HDPE), Zylon™ poly(p-phenylene-2,6-benzobisoxazole fiber (PBO), aramid fiber, Kevlar® poly-paraphenylene terephthalamide fiber, polyethylene terephthalate fiber (PET), Nylon fiber (PA), polyethylene naphthalate (PEN), polyester fiber (PL), polypropylene fiber (PP), polyethylene fiber (PE), a metal, ethylene vinyl alcohol fiber (EVOH), polyurethane fiber (PU), and the like. Suitable resins include one or more of epoxy resin, vinylester resin, thermoplastic resin, polyester resin, urethane, thermoplastic resin, and the like. The selection of materials and dimensions for the liner 26, as well as the type and amount of resin and fiber forming the outer composite shell 28, are selected based in part on the desired operating conditions of the pressure vessel 10.

The elongated tank 14 of FIG. 4 is formed when the liner 26 is covered with the outer composite shell 28, folded into a desired folded shape 126, and the resin cured to harden the outer composite shell 28. In various embodiments, the tank 14 can be folded into a three-dimensional structure 126. FIG. 4 illustrates one embodiment where an over-braided liner 26 is folded and held in a stacking architecture 126. Preferably, the inlet opening 70 of the tank 14 is arranged adjacent the outlet opening 74 of the tank 14, as generally shown in FIG. 4, such that the OTV assembly 18 can directly connect to both the inlet and outlet openings 70, 74 as further described below.

In the embodiment shown in FIG. 4, the tank 14 comprises a plurality of chambers 94 wherein an outlet 130 of each chamber 94 is fluidically coupled to an inlet 134 of an adjacent chamber 94' through a connector portion 38. The tank 14 shown in FIG. 4 includes an exemplary ten chambers 94, labeled T1-T10, fluidically connected to form one elongated tank 14. Chamber T1 is defined as a first chamber 98 since chamber T1 is adjacent the inlet opening 70 at the first end 54 of the liner 26. Chamber T10 is defined as a last chamber 102 since chamber T10 is adjacent the outlet opening 74 at the second end 58 of the liner 26. As illustrated in FIG. 4, chambers T1-T5 are preferably arranged vertically above chambers T6-T10.

Referring to FIG. 4, during a filling process fluid is added to the tank 14 through the inlet opening 70 at the first end 54 of the liner 26. Often, fluid 34 is pre-cooled prior to adding the fluid 34 to the tank 14. Fluid 34 within the chambers T1-T10 is compressed by the fluid 34 being added through the inlet opening 70. The compression of the fluid 34 in the chambers T1-T10 generates heat. Typically, the chamber T1 receiving the pre-cooled fluid 34 has a lower internal fluid temperature than the fluid 34 stored in chambers T2-T10 further away from the inlet opening 70 along the length of the tank 14. If the fluid 34 within the chambers T1-T10 is not mixed between the chambers T1-T10 during the fill process, a temperature gradient is likely to develop across the chambers T1-T10, with chamber T1 showing a lower fluid temperature than the temperature of the fluid 34 stored in chamber T10.

In the embodiment shown in FIG. 4, chambers T6-T10 will likely have a larger relative heat rise during the fill process than the heat rise within chambers T1-T5 since chambers T1-T5 are closer to the inlet opening 70 than chambers T6-T10. The chambers T6-T10 with a larger expected heat rise are positioned vertically below chambers T1-T5 having a smaller expected heat rise during the fill process. Preferably, the chambers T1-T10 are arranged in the stacking architecture 126 such that an average temperature rise of fluid within an upper layer of chambers 126A is less than an average temperature rise of fluid within a lower layer of chambers 126B during a fill process. Of note, the greatest temperature rise of the fluid is typically observed within the chambers T1-T10 near the completion of the fill process. A predetermined stacking structure 126 is selected based in part on the expected temperature rise of fluid within each chamber T1-T10 of the tank 14, the number and length of the chambers T1-T10, the available space for the folded pressure vessel 14, as well as other factors.

A preferred stacking architecture 126 positions chambers T1-T5 above chambers T6-T10 since chambers T1-T5 are expected to have a lower fluid temperature than the fluid temperature in chambers T6-T10 during the fill process. As the fluid temperature rises within the chambers T1-T10, the excess heat is transferred first by convection from the fluid 34 to the liner 26 and then conducted through the outer composite shell 28 and raising the temperature of an exterior surface 28' of the tank 14. The increase in temperature of the exterior surface 28' of the tank 14 causes the external air Hb, Ht surrounding the outer composite shell 28 to increase in temperature. The increase in temperature of the external air Hb, Ht surrounding the outer composite shell 28 is directly related to an increase in fluid temperature within the chambers T1-T10. As such, the heat rise during the fill process in the external air Hb surrounding chambers T6-T10 will be greater than the heat rise in the external air Ht surrounding chambers T1-T5 since chambers T6-T10 are expected to see a greater increase in fluid temperature than within chambers T1-T5. The expected relative difference in fluid temperatures between chambers T1-T5 and chambers T6-T10 results in convection through the stacking architecture 126 since heated external air Hb surrounding the hot chambers T6-T10 will rise towards the relatively cooler external air Ht surrounding chambers T1-T5. The movement of airflow Hb, Ht through the stacking architecture 126 due to convection C improves the heat dissipation Hb from the outer composite shell 28 covering chambers T6-T10.

Referring to FIG. 4, preferably the stacking architecture 126 is selected to include at least an upper layer of chambers 126A and a lower layer of chambers 126B. However, the stacking architecture 126 can include any number of layers of chambers 126A, 126B. Further, the chambers T1-T10 are positioned into at least the upper and lower layers of chambers 126A, 126B such that an expected average temperature rise within the fluid in the lower level of chambers 126B is greater than an expected average temperature rise within the fluid in the upper level of chambers 126A during a filling process. More complex stacking architectures 126 can be used for tanks 14 having more chambers T1-T10 than shown in FIG. 4 and likewise can include more than two layers of chambers 126A, 126B. However, a preferred embodiment is folding the tank 14 such that chambers 94, T6-T10 expected to see the greatest heat rise are positioned near and below chambers 94, T1-T5 expected to see the least heat rise during the fill process.

Turning to FIG. 2, boss-style fittings 110, 110' can be assembled with each opening 70, 74 in the liner 26 prior to and/or after forming the outer composite shell 28 around the liner 26. More specifically, a first fitting 110 can be coupled at a first end 54 of the tank 14 and a second fitting 110' can be coupled at a second end 58 of the tank 14. Although FIG. 2 illustrates fittings 110, 110' coupled to the connector portion 38 of the liner 26, in further embodiments, fittings 110, 110' can be coupled at any suitable portion of the tank 14, including the cuff portions 108, taper portions 42, and/or tubing portions 46. Such fittings 110, 110' can include crimp fittings, bolt fittings, or any other suitable type of fitting. For example, the fittings 110, 110' can include a stem 136 inserted into each of the openings 70, 74 in the liner 26, as shown in FIG. 2. Further, the fittings 110, 110' can include a ferrule 138 crimped around the outer composite shell 28 at each end 54, 58 of the liner 26 to fixedly couple the stem 136 to the liner 26 and the outer composite shell 28. The boss-style fittings 110, 110' can be configured to couple with ends 54, 58 of the liner 26, as shown in FIG. 2. In some embodiments, the fittings 110, 110' can be configured to couple with the over-braided outer composite shell 28.

The boss-style fittings 110, 110' are configured to interface with the OTV assembly 18, as illustrated in FIG. 2. In various embodiments, the OTV assembly 18 can be instrumented to detect tank conditions within the tank 14, including temperature, pressure, or the like, as described in more detail herein.

In some embodiments, the liner 26 of the tank 14 can comprise smooth cuffs 108 at one or both ends 54, 58 of the tank 14 for fitting 110, 110' attachment, such as shown in FIG. 2. As illustrated in FIG. 3, some embodiments of the liner 26 can include connector portions 38 having cuff portions 108 and corrugation sections 118 to allow for a smooth attachment surface for crimp fittings such as ferrules 138. Such cuff portions 108 at ends 54, 58 of the liner 26 can be various suitable diameters, which can be the same size as, larger than, or smaller than internal connector portions 38, and such connector portions 38 can be completely or partially corrugated 118. In other words, some embodiments can include repeating liner geometries for internal portions 106 of the liner 26 between the ends 54, 58 with a different liner 26 geometry on the ends 54, 58 of the liner 26. Non-periodic liner 26 geometries can also be used for specific applications.

Fittings 110, 110', shown in FIG. 2, can be made of various suitable materials including metal, plastic, or the like. In some embodiments, fittings 110, 110' can be configured to be in contact with compressed hydrogen and can be configured to be resistant to hydrogen embrittlement or weakening of the fittings 110, 110' and fracturing resulting from hydrogen diffusion into the fittings 110, 110'. For example, the fittings 110, 110' can comprise a material and/or surface coating that is resistant to hydrogen induced fracturing.

The stem 136 can define a bore 146 that extends longitudinally through the stem 136 between a first and second end 150, 154, as shown in FIG. 2. Further, the fitting 110, 110' can include a generally cylindrically-shaped head 158 configured to matingly engage with the OTV assembly 18. In some embodiments having a larger diameter bore 146 can be desirable to increase the flow rate through the bore 146, which can be desirable for faster filling. Additionally, a larger diameter bore 146 can be desirable for allowing sensors to be inserted into the bore 146 and into the interior cavity 30 defined by the liner 26. In various embodiments, the head 158 and/or the stem 136 can include an O-ring face-seal, an O-ring bore-seal, or the like, for sealing the liner 26 to the stem 136 and sealing the head 158 to the OTV assembly 18.

Referring to FIG. 2, the head 158 of the stem 136 can include threads 162, which can be configured to couple with the OTV assembly 18 such that suitable fluids can be introduced to and/or removed from an interior cavity 30 defined by the liner 26 as described in more detail herein. For example, where such a fluid comprises hydrogen, the OTV assembly 18 can be directly or indirectly coupled with a hydrogen filling station to fill the interior cavity 30 defined by the liner 26 with hydrogen. Further, the OTV assembly 18 can be directly or indirectly coupled with a vehicle engine to provide hydrogen fuel to the vehicle engine from hydrogen stored within the interior cavity 30 defined by the liner 26.

The OTV assembly 18, shown in FIG. 2, includes a first filling coupler 166 coupled to the first fitting 110 disposed at the first end 54 of the tank 14 and a second filling coupler 170 coupled to the second fitting 110' disposed at the second end 58 of the tank 14. The first and second filling couplers 166, 170 are fixedly coupled to an outer housing 174 of the OTV assembly 18. Each of the first and second filling couplers 166, 170 has a bore 178 passing axially through the coupler 166, 170 for passing fluid between the interior 30 of the tank 14 and the OTV assembly 18. Each bore 178 defines a passageway through the respective one of the first and second filling couplers 166, 170. The OTV assembly 18 includes an internal high pressure line 182 that fluidically couples the inlet opening 70 of the first end 54 of the tank 14 to the outlet opening 74 of the second end 58 of the tank 14, as will be further described below.

FIG. 2 shows a functional block diagram of the internal structure 184 of the OTV assembly 18. In addition to the first and second filling couplers 166, 170, the OTV assembly 18 includes one or more valves 186 controlled by at least one solenoid 190, one or more check valves 194 to control the direction of fluid flow through the OTV assembly 18, a temperature pressure relief device (TPRD) 198, and a filter 202 to remove particulates from the fluid 34. In addition, the OTV assembly 18 includes one or more temperature sensors 206, 210 to monitor the temperature of fluid flowing through the OTV assembly 18. Other components within the OTV assembly 18 may include an excess flow valve, a pressure sensor, an electronic controller, and the like. Also shown in FIG. 2, the OTV assembly 18 includes a third filling coupler 214 and a fourth filling coupler 218 for directly and/or indirectly coupling the OTV assembly 18 to an external fluid source 220, a hydrogen filling station 221 (shown in FIG. 6), and/or to a vehicle engine. In some embodiments, the fourth filling coupler 218 is configured to be coupled to a temperature pressure relief device (TPRD) vent, and the like. In addition, the OTV assembly 18 is configured to selectively provide fluid from the interior 30 of the tank 14 to at least one of the third filling coupler 214 and/or the fourth filling coupler 218 when the OTV assembly 18 is fluidically coupled to an external fuel cell supply line.

Figure 5:
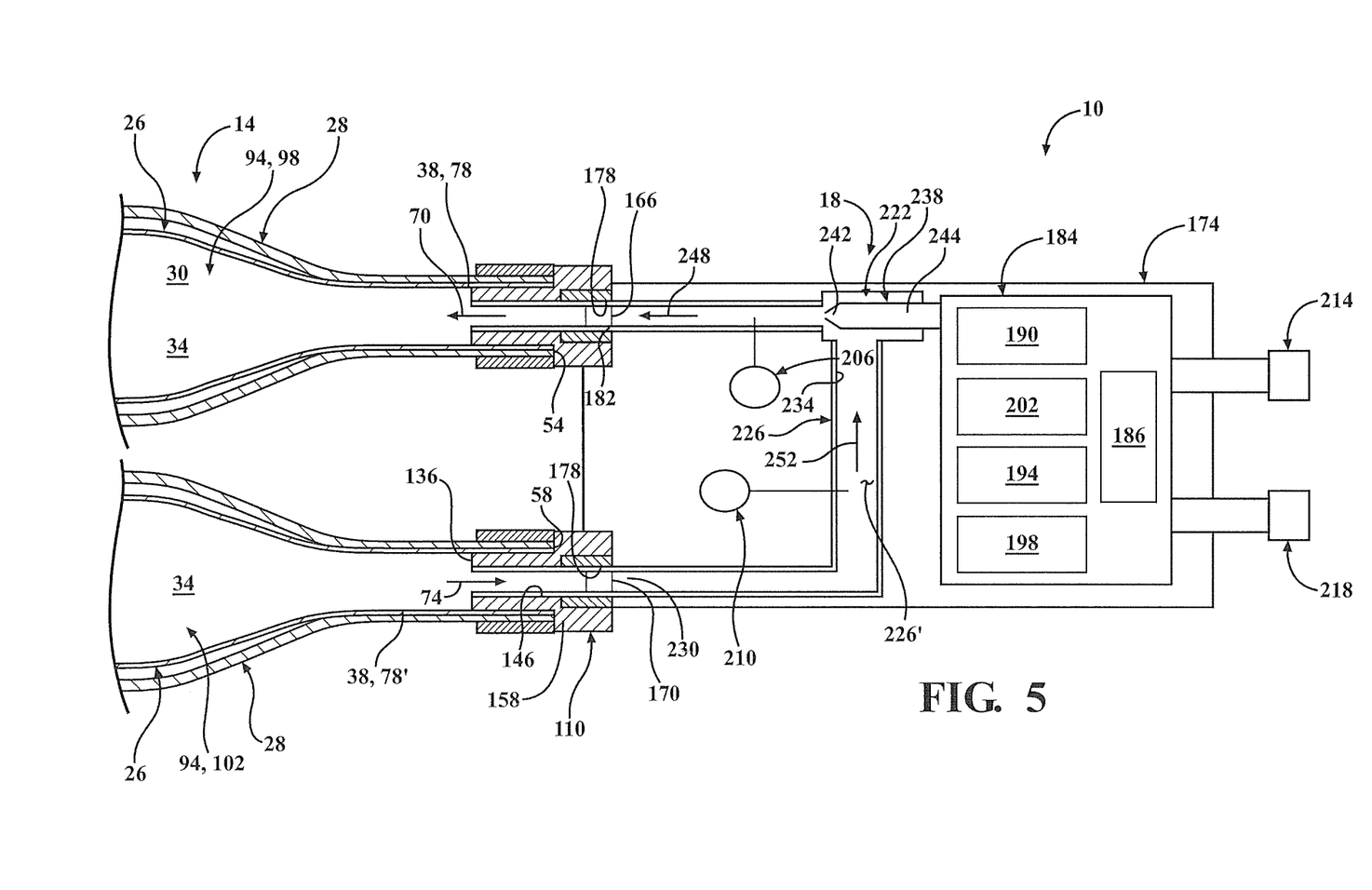
FIG. 5 is an enlarged cross-sectional view of a second embodiment of portion A of the pressure vessel of FIG. 1, illustrating a Venturi nozzle, a Venturi mixing chamber, and a suction line within the valve assembly, illustrating recirculation from a last chamber to a first chamber of the pressure vessel.

Referring to FIG. 5, one embodiment of the OTV assembly 18 includes a Venturi mixing chamber 222 fluidically coupled through a first high pressure line 182 to the first filling coupler 166. A suction line 226 is included in the OTV assembly 18 and has an inlet 230 fluidically coupled to the bore 178 passing through the second filling coupler 170 and an outlet 234 fluidically coupled to the Venturi mixing chamber 222. The suction line 226 is a second high pressure line 26 and includes an interior space 226' forming a passageway 226' for fluid. Both the first high pressure line 182 and the second high pressure line 226 are fully enclosed by the outer housing 174 of the OTV assembly 18. Other components included within the OTV assembly 18 include a Venturi nozzle 238 (also known as an eductor or an ejector) and temperature sensors 206, 210. The Venturi nozzle 238 is used to circulate fluid flow during the filling process, which can result in lower maximum temperatures of the fluid and/or of the tank 14 during the filling process.

The Venturi nozzle 238 of FIG. 5 has a nozzle outlet 242 that is fluidically connected to the Venturi mixing chamber 222 and a nozzle inlet 244 that is selectively fluidically connected to the third filling coupler 214 through the valve 186 of the OTV assembly 18. Further, a first temperature sensor 206 is configured to detect the temperature of fluid 248 passing from the Venturi nozzle 238 and into the Venturi mixing chamber 222. In addition, a second temperature sensor 210 is configured to detect the temperature of the fluid 252 passing through the suction line 226. Each temperature sensor 206, 210 is thermally coupled to the fluid flowing through a respective one of the Venturi nozzle 238 and the suction line 226.

The recirculation of fluid 34 through the OTV assembly 18 between the last chamber 102 and the first chamber 98 is illustrated in FIG. 5. When external fluid 220 is supplied through the third filling coupler 214 to the Venturi nozzle 238, fluid is ejected through the nozzle outlet 242 at an elevated pressure as indicated by arrow 248. The movement of the fluid 248 into the Venturi mixing chamber 222 draws fluid from the suction line 226 as illustrated by arrow 252.

The fluid 252 from the suction line 226 mixes with the fluid 248 from the Venturi nozzle 238 in the Venturi mixing chamber 222. The mixed fluid 248, 252 flows through the high pressure line 182 and is supplied to the first chamber 98 of the tank 14, as illustrated by arrow 70. Movement of fluid 252 through the suction line 226 draws fluid from the last chamber 102, as illustrated by arrow 74. The flow of fluid from the last chamber 102, through the suction line 226, through the Venturi mixing chamber 222, and into the first chamber 98 also causes fluid to flow through the entire length of the liner 14. The movement of the fluid through the entire length of the liner 14 reduces the temperature rise within individual chambers 94, 98, 102 during the fill process.

Figure 6:
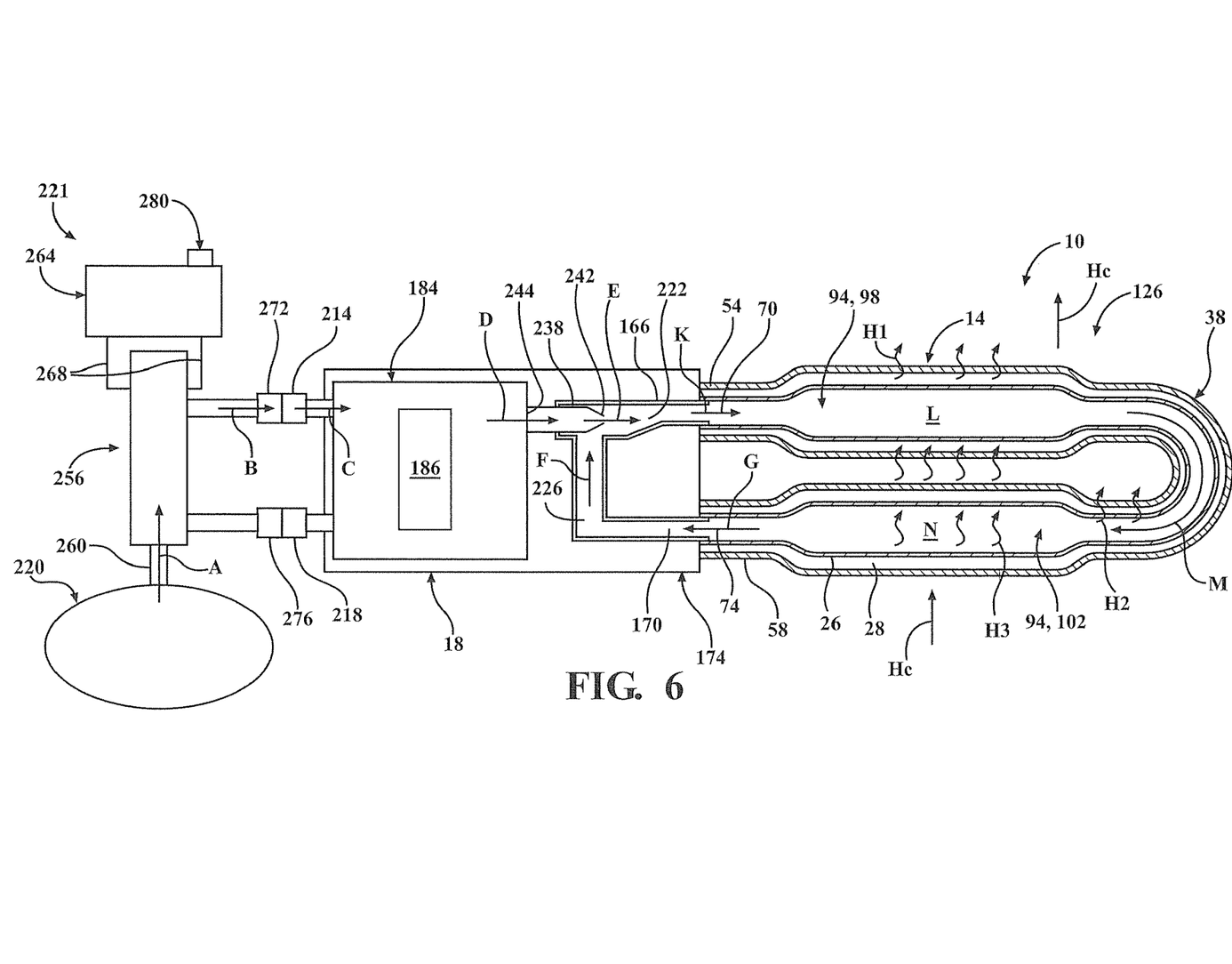
FIG. 6 illustrates a diagrammatic view of the pressure vessel of FIG. 1 coupled to an external filling station.

FIG. 6 illustrates a functional diagram of an embodiment of the pressure vessel 10 coupled to a hydrogen filling station 221. A hydrogen filling station 221 generally includes an external fluid source 220 coupled to one or more solenoid-actuated valves 256 through a high pressure flow line 260. The hydrogen filling station 221 includes a controller 264 electrically connected 268 to the one or more solenoid-actuated valves 256. The one or more solenoid-actuated valves 256 are fluidically connected to first and second fill ports 272, 276. The first fill port 272 is configured to couple with the third filling coupler 214 of the pressure vessel 10 such that external fluid 220 can be provided to the OTV assembly 18. The second fill port 276 is configured to couple to the fourth filling coupler 218 of the pressure vessel 10. Optionally, the second fill port 276 fluidically couples the fourth filling coupler 218 to a vent 280 for the temperature pressure relief device (TPRD) 198.

During a fill process, external fluid 220 passes through the valve(s) 256 of the hydrogen filling station 221, as illustrated by arrow A shown in FIG. 6. The external fluid 220 is delivered to the first fill port 272 by the valve(s) 256, as illustrated by arrow B. The external fluid 220 is received through the third filling coupler 214 and delivered to the valve 186 of the OTV assembly 18, as illustrated by arrow C. The external fluid 220 selectively passes through the valve 186 of the OTV assembly 18 and is delivered to the inlet 244 of the Venturi nozzle 238, as illustrated by arrow D. The Venturi nozzle 238 ejects fluid at an elevated pressure through the Venturi nozzle outlet 242 and through the Venturi mixing chamber 222, as illustrated by arrow E shown in FIG. 6. The flow of fluid E through the Venturi mixing chamber 222 draws fluid through the suction line 226, as illustrated by arrow F. Fluid G is suctioned from chamber 102 of the tank 14 by the movement of fluid F through the suction line 226. The fluid F, G from the suction line 226 is mixed in the Venturi mixing chamber 222 with the fluid E from the Venturi nozzle 238 to form fluid K that flows into chamber 98, as illustrated by arrow K shown in FIG. 6.

Also shown in FIG. 6, the fluid K mixes with the fluid L within chamber 98 and causes the fluid L to compress, releasing heat H1. The increased fluid pressure within chamber 98 combined with a decrease in fluid pressure in chamber 102 (due to fluid G leaving chamber 102) causes fluid M to flow through the connector portion 38 between chamber 98 and chamber 102, as illustrated by arrow M. The fluid M compresses fluid present within connector 38, generating additional heat 112. Since more fluid K is added to chamber 98 than the fluid G removed from chamber 102, the fluid M entering chamber 102 further compresses fluid N within chamber 102, resulting in additional heat generation H3.

Referring to FIG. 6, the excess heat H1, H2, H3 is transferred first by convection from the fluid to the liner 26 and then conducted through the liner 26 and the outer composite shell 28 of the tank 14. While the fill process is adding fluid E to the Venturi mixing chamber 222, the temperature of fluid L, M, N with the chambers 98, 102 and the connector portion 38 will continue to rise. However, chamber 102 will see a temperature rise greater than the temperature rise in chamber 98. By positioning chamber 102 below chamber 98, convection will occur causing the excess heat 113 of chamber 102 to rise towards chamber 98. The convection airflow around the chambers 98, 102 and through the stacking architecture 126 of the tank 14 reduces the temperature rise within chamber 102.

This convection effect is further increased by pre-cooling the fluid B entering the OTV assembly 18 of FIG. 6. When pre-cooled fluid E mixes with hot fluid F suctioned from chamber 102, the resulting mixed fluid K has a lower temperature than the fluid F, G leaving chamber 102. Adding the mixed pre-cooled fluid K to chamber 98 will increase the temperature difference between the upper chamber 98 and the lower chamber 102 such that the amount of convection through the stacking architecture 126 is increased. As the amount of convection through the stacking architecture 126 is increased, the amount of heat H3 increases that can be dissipated from the chambers 94, 98, 102.

Turning to FIG. 4, elongated conformable tanks 14 having a plurality of chambers T1-T10 can be folded such that chambers T6-T10 expected to see the greatest heat rise during filling are positioned below chambers T1-T5 expected to see less heat rise during filling to maximize convection airflow through the stacking architecture 126. Preferably, a folding pattern is selected that places the inlet opening 70 of the tank 14 adjacent the outlet opening 74 of the tank 14 such that a single OTV assembly 18 can directly couple to the inlet opening 70 and the outlet opening 74 of the tank 14 without requiring the use of high pressure lines outside of the housing 174 of the OTV assembly 18.

One benefit of the elongated pressure vessel 10 having an On-Tank-Valve (OTV) assembly 18 is the OTV assembly 18 fluidically couples opposing ends 50, 54 of the elongated pressure vessel 10 for filling and removing fluid from an interior 30 of the pressure vessel 10. A second benefit is the OTV assembly 18 includes a Venturi nozzle 238 and a Venturi mixing chamber 222 within the OTV assembly 18 configured to recirculate fluid from one end 50 to another end 54 of the tank fluidically coupled to both ends of the elongated pressure vessel. A third benefit is the OTV assembly minimizes the length of connecting fluid lines between the Venturi mixing chamber and both ends of the pressure vessel. A fourth benefit is the pressure vessel 10 is folded into a stacking architecture 126 such that the OTV assembly 18 can couple directly to both ends 50, 54 of the pressure vessel 10 without using external fluid lines. A fifth benefit is the stacking architecture 126 of the pressure vessel 10 improves heat dissipation from the pressure vessel 10 during the fill process.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A pressure vessel comprising:
   an elongated folded tank having an interior for storage of fluid, said tank including a polymeric liner defined by an elongated cylindrical wall extending between a first tank end and a second tank end, said liner having a plurality of chambers for storage of fluid, said plurality of chambers including at least a first chamber adjacent said first tank end and a last chamber adjacent said second tank end, said liner surrounded by an outer composite shell of resin and fiber, and said elongated folded tank folded into a predetermined stacking architecture such that said first tank end is adjacent said second tank end; and a valve assembly coupled to said elongated folded tank, said valve assembly comprising:
- a first filling coupler operatively coupled to said first tank end;
- a second filling coupler operatively coupled to said second tank end;
- a mixing chamber, said mixing chamber communicating with said first filling coupler to introduce fluid to said first tank end and into said interior of said tank;
- at least one Venturi nozzle configured to introduce a first flow of fluid from an external fluid source to said mixing chamber;
- a suction line communicating with said second filling coupler and coupled to said mixing chamber such that when a second flow of fluid originates from said second end of said tank, said second flow of fluid flows into said mixing chamber and is mixed with said first flow of fluid within said mixing chamber;
- a third filling coupler for selectively coupling said valve assembly to an external fluid source for receiving said first flow of fluid from said external fluid source, said third filling coupler selectively coupled to said Venturi nozzle; and
- said valve assembly includes a fourth filling coupler for selectively coupling said valve assembly to a temperature pressure relief device (TPRD) vent.

2. The pressure vessel as set forth in claim 1, wherein:
said plurality of chambers in said predetermined stacking architecture includes at least an upper layer of chambers and a lower layer of chambers; and
an average temperature rise of fluid within said upper layer of chambers is less than an average temperature rise of fluid within said lower layer of chambers during a fill process.

3. The pressure vessel as set forth in claim 2, wherein:
said valve assembly includes a first valve, said first valve selectively fluidically coupling said third filling coupler to said Venturi nozzle, said first valve having an open condition and a closed condition;
when said first valve is in said open condition, said first flow of fluid from said external fluid source received by said third filling coupler is provided to said Venturi nozzle; and
when said first valve is in said closed condition, said first flow of fluid from said external fluid source received by said third filling coupler is fluidically decoupled from said Venturi nozzle.

4. The pressure vessel as set forth in claim 3, wherein:
said first filling coupler including a passageway for passing fluid between said mixing chamber and said interior of said first chamber of said tank; and
said second filling coupler including a passageway for passing fluid between said suction line and said interior of said last chamber of said tank.

5. The pressure vessel as set forth in claim 4, wherein:
said valve assembly including a first temperature sensor thermally coupled to said mixing chamber, said first temperature sensor configured to provide a first temperature signal indicative of a temperature of fluid entering said mixing chamber from said Venturi nozzle.

6. The pressure vessel as set forth in claim 5, wherein:
said valve assembly includes a second temperature sensor thermally coupled to an interior space of said suction line, said second temperature sensor configured to provide a second temperature signal indicative of a temperature of fluid passing through said suction line.

7. The pressure vessel as set forth in claim 6, wherein:
said valve assembly includes a first solenoid operatively connected to said first valve, said first solenoid configured to selectively reposition said first valve between said open condition and said closed condition.

8. The pressure vessel as set forth in claim 7, wherein:
said valve assembly is configured to selectively provide fluid from said interior of said tank to at least one of said third filling coupler and/or said fourth filling coupler when said valve assembly is fluidically coupled to an external fuel cell supply line.

9. The pressure vessel as set forth in claim 8, wherein:
said valve assembly includes a first high pressure line fluidically coupling said mixing chamber to said first filling coupler.

10. The pressure vessel as set forth in claim 9, wherein:
said suction line comprises a second high pressure line having a first end fluidically coupled to said mixing chamber and a second end fluidically coupled to said second filling coupler such that said second flow of fluid originating from said second end of said tank passes through said second high pressure line and into said mixing chamber.

11. The pressure vessel as set forth in claim 10, wherein:
said valve assembly comprising an outer housing, said first filling coupler and said second filling coupler fixedly coupled to said outer housing; and
said first high pressure line and said second high pressure line being fully contained within said outer housing.

12. The pressure vessel as set forth in claim 11, wherein:
said first tank end arranged adjacent said second tank end such that said valve assembly can directly couple to both said first and second ends of said tank.

13. The pressure vessel as set forth in claim 12, wherein:
said valve assembly being fixedly coupled to said first and second ends of said tank such that said first and second high pressure lines fluidically coupling said first and second ends of said tank are fully enclosed within said valve assembly.

14. The pressure vessel as set forth in claim 13, wherein:
said polymeric liner comprises a plurality of elongated rigid tubing portions having a first diameter, a plurality of connector portions having a second diameter that is smaller than said first diameter, and taper portions disposed between and coupling successive elongated rigid tubing portions and connector portions, each of said plurality of elongated rigid tubing portions defining one of said plurality of chambers for storage of fluid;
said polymeric liner surrounded by id outer composite shell to form s elongated tank; and
said elongated tank being folded into said predetermined stacking architecture prior to curing resin in said outer composite shell.

15. The pressure vessel as set forth in claim 14, wherein:
said last chamber of said pressure vessel being positioned lower within said stacking architecture than a position of said first chamber within said stacking architecture; and
a relative difference between air temperature surrounding an exterior surface of said first chamber and air temperature surrounding an exterior of said last chamber during a fill process results in convection of heat through said stacking architecture.

* * * * *